United States Patent [19]

Sugiyama et al.

[11] Patent Number: 4,633,329
[45] Date of Patent: Dec. 30, 1986

[54] INFORMATION SIGNAL RECORDING MEDIUM AND REPRODUCING APPARATUS THEREFOR

[75] Inventors: Hiroyuki Sugiyama, Isehara; Nobuaki Takahashi, Yamato; Takeshi Shibamoto, Sagamihara; Hideo Sato, Yokohama; Mitsuo Kubo, Yamato; Koji Tanaka, Tokyo; Tsuneo Furuki, Yamato; Fujio Suzuki, Tokyo, all of Japan

[73] Assignee: Victor Company of Japan, Ltd., Japan

[21] Appl. No.: 537,529

[22] Filed: Sep. 30, 1983

[30] Foreign Application Priority Data

Oct. 4, 1982 [JP] Japan .................................. 57-174297

[51] Int. Cl.$^4$ ........................................... H04N 9/491
[52] U.S. Cl. ................................... 358/310; 358/342; 360/19.1; 360/29; 360/32
[58] Field of Search ................. 358/310, 335, 342; 360/8, 18, 19.1, 20, 24, 29, 32, 33.1

[56] References Cited

U.S. PATENT DOCUMENTS

| | | | |
|---|---|---|---|
| 4,142,209 | 2/1979 | Hedlund | 369/47 X |
| 4,488,182 | 12/1984 | Takahashi et al. | 358/310 |
| 4,491,861 | 1/1985 | Sochor | 358/310 X |

FOREIGN PATENT DOCUMENTS

| | | |
|---|---|---|
| 0007655 | 2/1980 | European Pat. Off. . |
| 3133714 | 4/1982 | Fed. Rep. of Germany . |
| 3207111 | 9/1982 | Fed. Rep. of Germany . |
| 2094591 | 9/1982 | United Kingdom . |
| 2115639 | 9/1983 | United Kingdom . |

OTHER PUBLICATIONS 1975-1975 Dictionary of Electronics, Radio Shack.

Primary Examiner—Robert L. Richardson
Attorney, Agent, or Firm—Andrus, Sceales, Starke & Sawall

[57] ABSTRACT

An information signal recording medium has a spiral track on which an information signal is recorded. The information signal includes picture element data which correspond to one field, and is time-sequentially recorded on the spiral track in terms of the picture element data which correspond to one field. The picture element data which correspond to one field are made up of a plurality of picture element data of a first field and a plurality of picture element data of a second field, among picture element data which are obtained by subjecting an analog video signal to a digital pulse modulation, where the analog video signal corresponds to one frame made up of the first and second fields. A reproducing apparatus is designed to reproduce the second field in a sequence different from a sequence with which the recorded picture element data are reproduced from the information recording medium in the first field.

5 Claims, 11 Drawing Figures

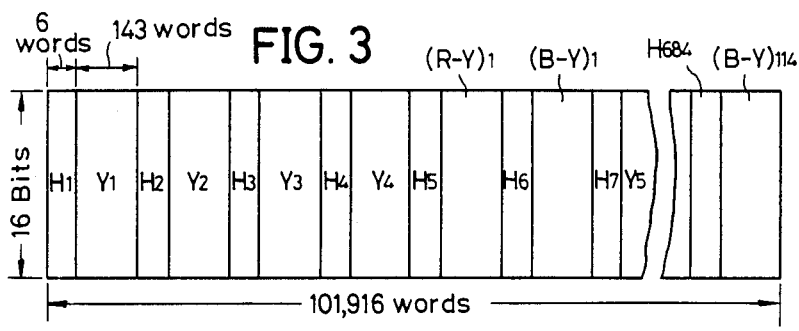
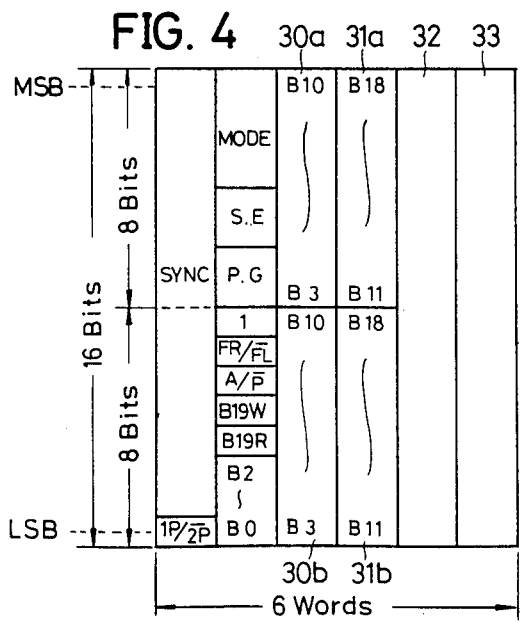
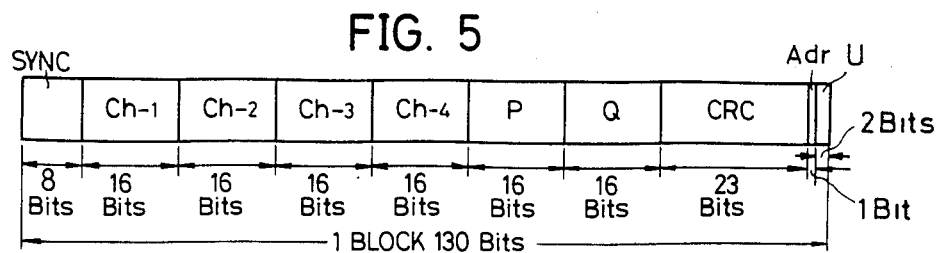

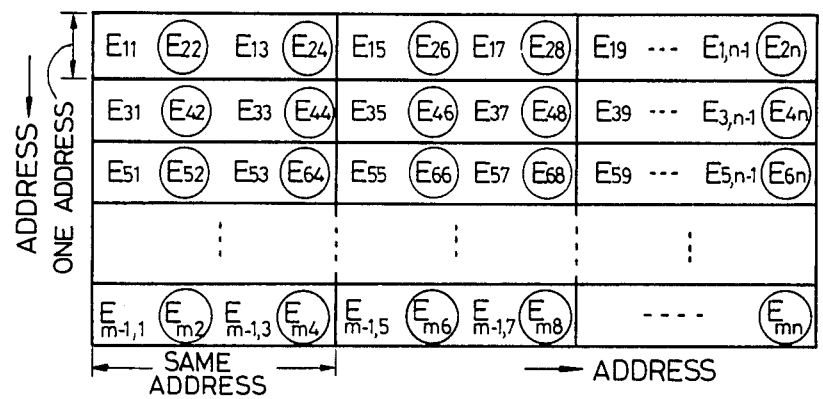

INFORMATION SIGNAL RECORDING MEDIUM AND REPRODUCING APPARATUS THEREFOR

BACKGROUND OF THE INVENTION

The present invention generally relates to information signal recording mediums and reproducing apparatuses therefor, and more particularly to an information recording medium which is recorded with picture element data amounting to a total of one field which is formed from arbitrary picture element data in first and second fields which make up one frame of a digital video signal, and a reproducing apparatus therefor. The reproducing apparatus is designed to reproduce the second field in a sequence different from a sequence with which the recorded picture element data are reproduced from the information recording medium in the first field.

Recently, systems which record a digital video signal obtained by subjecting video and audio signals to digital pulse modulation such as pulse code modulation (PCM) and a digital audio signal onto a rotary recording medium (hereinafter simply referred to as a disc) as variations in geometrical configuration, and reproduce the recorded signal as variations in the intensity of light reflected from the disc or variations in electrostatic capacitance, have been developed and realized. Further, recording systems have been proposed for digital audio discs, according to which a digital video signal comprising color still picture information is added to a digital audio signal and recorded together on the same track on the disc. Generally, a plurality of music programs are recorded on the same side of such a digital audio disc, and the digital video signal comprising the color still picture information is recorded in correspondence with each of the recorded music programs. When reproducing such a digital audio disc, the music programs on the disc can be reproduced by a reproducing system which is common throughout the world.

However, the television systems are not common throughout the world, and there roughly exist three kinds of television systems. Accordingly, in order to enable reproduction of the video signal recorded on the disc even if the television system employed in a region or country is different from the television system of the recorded video signal, it is first necessary to convert the recorded video signal into a signal format in accordance with the television system of the reproducing apparatus used in that region or country before obtaining a reproduced picture. The information content of the above digital video signal relates to a color still picture which helps the listener's imagination when he listens to the reproduced sounds of the digital audio signal. Hence, it is desirable to reproduce the digital video signal from the disc in the signal formats which are in accordance with each of the television systems, regardless of the differences in the television systems throughout the world.

The color television systems throughout the world can be divided roughly into three systems, that is, NTSC, PAL, and SECAM systems, according to the transmission formats of the chrominance signal. In each of these color television systems, the color video signal is constituted by a luminance signal and two kinds of color difference signals. Hence, it is desirable to employ a component coding system which transmits the color video signal by independently subjecting the luminance signal and the two kinds of color difference signals to digital pulse modulation, in order to facilitate compatibility between the three systems. Moreover, it is desirable to employ the component coding system in view of the fine picture quality which may be obtained by use of a display monitor having input terminals for the three primary colors of red (R), green (G), and blue (B) which will probably be realized in the future, and especially because partial moving pictures may be recorded on the digital audio discs, and the like.

The frequency band of the luminance signal within the television broadcasting signal, is 4.2 MHz in the NTSC system, and 5 MHz or 6 MHz in the PAL and SECAM systems. However, the frequency band of the luminance signal which is actually transmitted and used in the television receiver is up to approximately 3 MHz in the NTSC system, and up to a range of 3 MHz to 4 MHz in the PAL and SECAM systems. Accordingly, it is possible to lower the sampling frequency to approximately 8 MHz, although it is preferable to reserve a certain margin.

Thus, if the sampling frequency of the luminance signal is selected to 9 MHz, and the sampling frequencies of the two kinds of color difference signals (R−Y) and (B−Y) are each selected to 2.25 MHz which is ¼ the frequency of 9 MHz, the number of sampling points of the luminance signal in one scanning line, becomes equal to 576 ($=(9\times10^6)/(15.625\times10^3)$). However, these sampling points include the horizontal blanking periods such as the horizontal synchronizing signal intervals and the color burst signal intervals. Hence, if the sampling points in these horizontal blanking periods are excluded from the sampling points of the luminance signal, the number of sampling points of the luminance signal in one scanning line may be reduced to approximately 456.

On the other hand, a generally marketed 54k RAM has $2^{16}$ ($=65,536$) bits. Thus, $2^{18}$ ($=4\times2^{16}=262,144$) bits are obtainable is four of such 64k RAMs are used. If this number $2^{18}$ is divided by 456 which is the number of effective sampling points of the luminance signal in one scanning line, the quotient becomes approximately equal to 574.87. Hence, if the number of effective scanning lines among the 625 scanning lines in one frame, which are transmitted as a picture, is selected to 572 which is exceedingly close to the number 574.87 but is less than 574.87 as previously proposed in a U.S. patent application Ser. No. 485,054 filed Apr. 14, 1983 entitled "DIGITAL VIDEO SIGNAL RECORDING SYSTEM AND REPRODUCING APPARATUS" (now U.S. Pat. No. 4,520,401) in which the assignee is the same as the assignee of the present application, each picture element data of the effective sampling points of the luminance signal in one frame can be efficiently stored by use of four 64k RAMs.

The information quantity of the two kinds of color difference signals which are obtained by independently subjecting the two kinds of color difference signals (R-Y) and (B-Y) at the sampling frequency of 2.25 MHz, is ¼ the information quantity of the above digital luminance signal. The picture element data of the effective sampling points of one of the two color difference signals can thus be efficiently stored in one 64k RAM. Accordingly, if the picture element data of one sampling point is represented by six bits, one frame of the digital video signal in which the digital luminance signal and the two kinds of color difference signals are time-sequentially multiplexed, can be stored by use of thirty-six (=6×(4+1 +1)) 64k RAMs.

Generally, the digital video signal reproducing apparatus only comprises field memories. Further, the video signal corresponding to only one of the two fields in one frame, is recorded on the disc. Conventionally, when only the digital video signal of one field is transmitted, only the data related to the picture elements of one of first and second fields in one frame are transmitted among 114×4 picture elements in the scanning direction (horizontal direction) and 572 picture elements in the vertical direction which make up one frame. The number 114×4 is for the case of the luminance signal, and the picture elements in the scanning direction is 114 in the case of the color difference signal (R−Y) or (B−Y). Therefore, compared to the case where the video signal of one frame is transmitted, the vertical resolution of the reproduced picture inevitably became poor, and aliasing noise increased. In addition, jitter was introduced in the vertical direction of the picture, and oblique lines in the picture obtained by reproducing the transmitted signal, were reproduced in the form of steps. Furthermore, when horizontal lines which differ in their widths and positions existed in the picture, there was a problem in that such horizontal lines were reproduced with the differences overemphasized.

SUMMARY OF THE INVENTION

Accordingly, it is a general object of the present invention to provide a novel and useful information signal recording medium and reproducing apparatus therefor, in which the above described problems have been eliminated.

Another and more specific object of the present invention is to provide an information signal recording medium which is recorded with picture element data amounting to a total of one field which is formed from arbitrary picture element data in first and second fields which make up one frame of a digital video signal, and a reproducing apparatus therefor. According to the present invention, it is possible to obtain a reproduced picture of high quality and small deterioration in the vertical resolution, compared to a reproduced picture which is obtained by reproducing picture element data of only one of the first and second fields. In the present specification, the reproduced picture which is obtained when picture element data corresponding to one field is reproduced, will be referred to as a "field picture".

Still another object of the present invention is to provide an information signal recording medium which is time-sequentially recorded with picture element data amounting to a total of one field and being arranged in a checkered pattern, among picture element data which are obtained by subjecting one frame of analog video signal to digital pulse modulation, on a spiral track formed thereon, and to provide a reproducing apparatus therefor. The reproducing apparatus of the present invention plays the information signal recording medium, and successively writes the reproduced picture element data into field memories. Among the picture element data written into the field memories, a picture element data which is located at the i-th position with respect to the vertical direction of the picture and located at the j-th position with respect to the horizontal direction of the picture, is designed by $PE_{ij}$, where i and j are natural numbers equal to or greater than 2. During a reproducing period of one field, the picture element data are read out from a field memory in a sequence $PE_{(i-1)(j-1)}$, $PE_{ij}$, $PE_{(i-1)(j+1)}$, .... During a reproducing period of a subsequent field, the picture element data are read out in a sequence $PE_{(i+1)(j-1)}$, $PE_{ij}$, $PE_{(i+1)(j+1)}$, .... These read out operations are alternately carried out in terms of field periods, in a repeated manner. Accordingly, the picture element data read out from the field memory can be converted into a television signal of a standard television system, by passing the read out picture element data through a digital-to-analog converter.

The information signal recording medium of the present invention is recorded with picture element data, amounting to a total of one field which is formed from arbitrary picture element data in the first and second fields which make up one frame of a digital video signal. Thus, the field picture can be reproduced with reduced deterioration in the vertical resolution compared to the conventional recording medium. In addition, the reproducing apparatus according to the present invention is designed to reproduce the second field in a sequence different from a sequence with which the recorded picture element data are reproduced from the information recording medium in the first field. Hence, the picture element data of the first and second fields are alternately arranged in one scanning line, during the reproducing time of the first field and also during the reproducing time period of the second field. As a result, the aliasing noise can be dispersed in the high frequencies, and the visual noise due to the aliasing noise can be reduced. Further, jitter in the vertical direction of the picture can essentially be eliminated.

Other objects and further features of the present invention will be apparent from the following detailed description when read in conjunction with the accompanying drawings.

BRIEF DESCRIPTION OF THE DRAWINGS

FIG. 3 shows an example of a signal format of a digital video signal of one field, which digital video signal is recorded onto the information signal recording medium according to the present invention;

FIG. 4 shows a signal format of a header signal in the format shown in FIG. 3;

FIG. 5 shows an example of a signal format of a digital signal which is recorded by the recording system shown in FIG. 2;

FIG. 9 shows the relationship between the picture element data stored in the field memory within the reproducing apparatus according to the present invention, and memory addresses; and FIGS. 10A and 10B diagrammatically show display positions of reproduced picture element data in the picture during a reproducing time period of a first field and during a reproducing time period of a second field, respectively.

DETAILED DESCRIPTION

Figure 1:
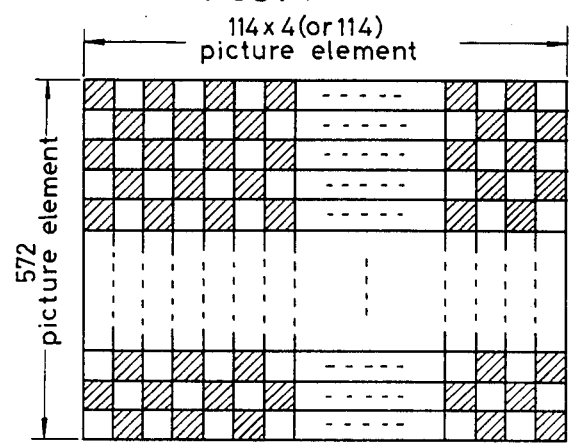
FIG. 1 is a diagram showing an arrangement of picture elements in a picture, where data of the picture element are recorded onto an information signal recording medium according to the present invention.

FIG. 1 shows an embodiment of an arrangement of picture element data in a picture, which picture element data are recorded on an information signal recording medium according to the present invention and reproduced by a reproducing apparatus according to the present invention. In the case of a digital luminance signal, one picture (or one frame) is made up of 114×4 picture elements in the horizontal direction, and 572 picture elements in the vertical direction, as described before. In the case of the two color difference signals, one picture is made up of 114 picture elements in the horizontal direction, and 572 picture elements in the vertical direction. Among the picture element data making up one picture, picture element data which are arranged in a checkered pattern as indicated by squares with hatchings in FIG. 1 and amount to a total of one field, are transmitted.

Figure 2:
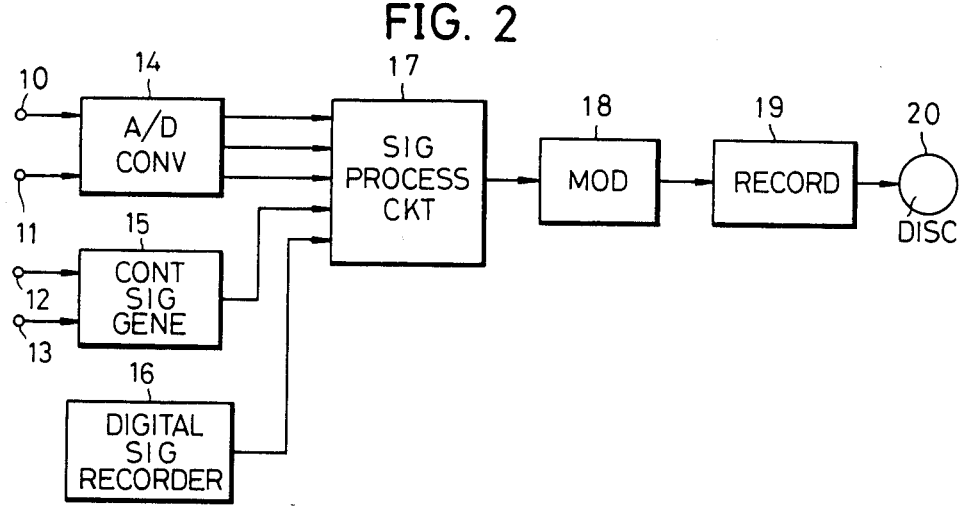
FIG. 2 is a systematic block diagram showing an example of a recording system which records the information onto the information signal recording medium according to the present invention.

FIG. 2 shows a systematic block diagram of an example of a recording system which records the information onto the information signal recording medium according to the present invention. The present example is an example in which the recording is carried out with respect to a digital audio disc described before. Among the total of four channels of transmission paths, the digital video signal is transmitted in one or two channels. The digital audio signal is transmitted in the remaining channels. Description will be given with respect to an example in which the digital video signal and the digital audio signal are each transmitted in two channels.

2-channel analog audio signals are independently applied to input terminals 10 and 11. A start signal is applied to an input terminal 12. A cue signal is applied to an input terminal 13 every time a music program of the analog audio signal changes from one music program to another.

It will be assumed that a digital signal with a sampling frequency of 44.1 kHz (or 47.25 kHz) and a quantization number of sixteen bits and having an information quantity of one channel, is time-sequentially recorded onto a disc 20 which will be described hereinafter for four channels on one track turn. Thus, in this case, the 2-channel analog audio signal supplied to an analog-to-digital (A/D) converter 14, is sampled at a sampling frequency of 44.1 kHz (or 47.25 kHz) with respect to each of the channels. The signal thus converted into a digital audio signal (PCM audio signal) with a quantization number of sixteen bits with respect to one picture, is supplied to a signal processing circuit 17. Moreover, a control signal generating circuit 15 which is supplied with the start signal through the input terminal 12 and the cue signal through the input terminal 13, generates a control signal. The control signal generated by this control signal generating circuit 15, is supplied to the signal processing circuit 17. The control signal is used for controlling the position of a pickup reproducing element during an operation mode such as a random access mode.

A digital video signal having a signal format shown in FIG. 3, is recorded in a digital signal recorder 16. This recorded digital video signal is reproduced and supplied to the signal processing circuit 17. The digital video signal of one field which is transmitted, is made up of 684 header signals represented by $H_1$ through $H_{684}$, and component coded signals represented by $Y_1$, $Y_2$, $Y_3$, $Y_4$, ..., $(R-Y)_1$, $(B-Y)_1$, ... shown in FIG. 3.

First, description will be given with respect to the component coded signals. Among the signals in the video period of the color video signal which amounts to one frame and has 625 scanning lines and a horizontal scanning frequency of 15.625 kHz, the luminance signal sampled at a sampling frequency of 9 MHz and quantized with a quantization number of eight bits, as described before. On the other hand, the two kinds of color difference signals (R−Y) and (B−Y) are each sampled at a sampling frequency of 2.25 MHz and quantized with a quantization number of eight bits. As described before, the number of sampling points (number of picture elements) of the digital luminance signal in one scanning line is 456, and the number of effective scanning lines in one frame of the digital luminance signal is 572.

When pre-recording the digital video signal, the digital luminance signal and the two kinds of digital color difference signals are respectively written into first through third memory circuits (not shown). Further, by use of a read-out control signal which has a predetermined frequency, the digital luminance signal is read out from the first memory circuit with a sampling frequency of 88.2 kHz and a quantization number of eight bits. The two kinds of digital color difference signals are each similarly read out from the second and third memory circuits with a sampling frequency of 88.2 kHz and a quantization number of eight bits. The digital luminance signal and the two kinds of digital color difference signals which are read out from the first through third memory circuits, are supplied to a switching circuit (not shown). This switching circuit is also supplied with a header signal having a sampling frequency of 44.1 kHz and a quantization number of sixteen bits. The switching circuit switches these four digital signals which are received in a predetermined sequence, and generates a digital video signal which amounts to one field and has the signal format shown in FIG. 3. The digital video signal generated from the switching circuit is supplied and recorded in the digital signal recorder 16 shown in FIG. 2.

In FIG. 3, if it is assumed that one word comprises sixteen bits, the digital video signal which of one field is made up of a total of 101,916 words. The digital luminance signals $Y_1$ through $Y_{456}$ each comprising 143 words, the digital color difference signals $(R-Y)_1$ through $(R-Y)_{114}$ and $(B-Y)_1$ through $(B-Y)_{114}$ each comprising 143 words, and a total of 684 header signals $H_1$ through $H_{684}$ each comprising six words and each located in front of each of the digital luminance signals and the digital color difference signals, are time-sequentially multiplexed in the digital video signal which of one field.

Accordingly, if it is assumed that the digital video signal corresponding to one field is transmitted in two channels by use of two words (thirty-two bits) within one block shown in FIG. 5 which will be described hereinafter, the digital video signal of one field will be transmitted within approximately 1.16 seconds because the repetition period of the signal of one block becomes equal to the inverse number (sampling period) of the sampling frequency of 44.1 kHz. When the sampling period and the repetition period of the signal of one block is equal to the inverse number of the frequency of 47.25 kHz, the digital video signal corresponding to one field will be transmitted within 1.08 seconds.

The 143-word digital luminance signal $Y_1$ which is transmitted subsequent to the header signal $H_1$, represents a picture element data group comprising a total of 286 picture element data related to the first field, and thus represents the picture element data shown with the hatchings in the leftmost column of the picture in FIG. 1, for example. Each word among the 143-word digital luminance signal $Y_1$ comprises upper eight bits and lower eight bits, and two picture element data are arranged in each word. In addition, the 143-word digital luminance signal $Y_2$ which is transmitted subsequent to the header signal $H_2$, represents a picture element data group comprising a total of 286 picture element data related to the second field, and thus represents the picture element data shown with the hatchings in the second column from the left in the picture shown in FIG. 1, for example. Similarly, two picture element data are arranged in each word consisting of the upper and lower eight bits.

Furthermore, the digital luminance signal $Y_3$ transmitted subsequent to the header signal $H_3$, represents a picture element data group comprising 286 picture element data related to the first field, and hence represents the picture element data in the third column from the left in the picture. The digital luminance signal $Y_4$ transmitted subsequent to the header signal $H_4$, represents a picture element data group comprising 286 picture element data related to the second field, and hence represents the picture element data in the fourth column from the left in the picture. Moreover, the digital luminance signal $Y_5$ transmitted subsequent to the header signal $H_7$, represents a picture element data group comprising 286 picture element data related to the first field, and thus represents the picture element data in the fifth column from the left in the picture.

In addition, the digital signal $(R-Y)_1$ transmitted subsequent to the header signal $H_5$, represents a picture element data group of the first digital color difference signal, comprising 286 picture element data related to the first field, and thus represents the picture element data in the leftmost first column in the picture, for example. The digital signal $(B-Y)_1$ transmitted subsequent to the header signal $H_6$, represents a picture element data group of the second digital color difference signal, comprising 286 picture element data related to the first field, and thus represents the picture element data in the leftmost first column in the picture, for example. Accordingly, the component coded signals have a signal format such that the signals are transmitted time-sequentially in terms of six picture element data groups. The six picture element groups comprises the picture element data groups of the digital luminance signal in the four columns in the vertical direction, and the picture element data groups of the two kinds of digital color difference signals which are each in one of the two columns in the vertical direction. The picture element data related to the first field are transmitted by the picture element data groups in the odd columns, and the picture element data related to the second field are transmitted by the picture element data groups in the even columns. The transmitted picture element data related to the first field and the transmitted picture element data related to the second field, are recorded in the digital recorder 16.

Next, description will be given with respect to the signal format of the header signals $H_1$ through $H_{684}$, by referring to FIG. 4. The header signals $H_1$ through $H_{684}$ are each made up of six words. In FIG. 4, the arrangement of the bits is shown in the vertical direction, where the uppermost bit represents the most significant bit (MSB) and the lowermost bit represents the least significant bits (LSB). The words are shown in the horizontal direction. The first word of the header signal comprises a synchronizing signal which consists of upper fifteen bits which are all "1", and a 1-bit transmission channel identification code represented by "1P/2P" which is located at the LSB. The transmission channel identification code identifies the channels which are used to transmit the digital video signal, among the four transmission channels. When this transmission identification code is "1P", that is, when "1", it is identified that the digital video signal is transmitted in the fourth channel. On the other hand, when the transmission channel identification code is "2P", that is, when "0", it is identified that two channels, namely, the third and fourth channels, are used to transmit the digital video signal. In the present embodiment, it will be assumed that the transmission channel identification code is "2P", that is, "0". When the transmission channel identification code is "2P", the kind of picture to which the digital video signal relates, may be made mutually different in the third and fourth channels. The kind of picture may be pictures such as a scenery, portrait, and a scene showing a musician play. By making the kinds of pictures which are transmitted in the third and fourth channels different from each other, it becomes possible for the viewer to select his preference. However, in the present embodiment, the third and fourth channels each transmit one word of the same picture. That is, the sampling frequency is equivalently doubled by this transmission method.

Various identification codes are transmitted in the second word of the header signal. A 4-bit picture mode identification code represented by "MODE", is located in the upper four bits in the second word of the header signal. This picture mode identification code identifies whether the digital video signal which is to be recorded relates to a regular still picture (the description given before in conjunction with FIG. 3 was an example of the case where the digital video signal which is to be recorded relates to this regular still picture), a moving picture using a run-length code, a high definition still picture with 1125 scanning lines, or the like. A 2-bit special effect identification code represented by "S.E." is located in the subsequent fifth and sixth bits among the upper eight bits in the second word of the header signal. This special effect identification code identifies special effects such as fade-in, and changing of the picture from the top or left of the picture, with respect to the still picture.

A 2-bit picture category identification code represented by "P.G.", is located in the subsequent seventh and eighth bits among the upper eight bits. When the third and fourth channels are used to transmit independent digital video signals, a normal picture is transmitted in the fourth channel, for example. Then, a special picture in which various kinds of digital video signals are time-sequentially multiplexed, is transmitted in the third channel. In such a case, the picture category identification code indicates the value of a category number which is assigned to each of the various categories of pictures (the maximum number of categories is four in the present embodiment) transmitted in the third channel. Each of the pictures transmitted in the third channel must have continuity when displayed, and are pictures (musical scores, scenery, illustrations, scene showing a musician play, and the like, for example) which should not be changed to another picture before their display is completed. The picture category identification code identifies the category number which is assigned according to the category of the picture. Accordingly, when the viewer selects to reproduce the picture of the third channel and specifies a desired category number, only the picture corresponding to the specified category number is continuously reproduced, and the picture corresponding to that specified category number is prevented from being interrupted by pictures corresponding to other category numbers.

The ninth bit, that is, the first bit among the lower eight bits, of the second word which is represented by "1", indicates a binary "1". This ninth bit is provided so as to prevent all the sixteen bits in the second word from becoming "0" when the values of the various codes all become "0". A 1-bit picture information quantity identification code represented by "FR/$\overline{FL}$", is located at the tenth bit of the second word of the header signal. This picture information identification code identifies whether the digital video signal which is to be transmitted amounts to one frame or one field. It is identified that the digital video signal amounts to one frame when this picture information quantity identification code is "1", and on the other hand, that the digital video signal corresponds to one field when the picture information quantity identification code is "0". The signal format of the video signal part differs according to whether the digital video signal is transmitted in terms of frames or fields. Accordingly, the reproducing apparatus detects the picture information quantity identification code, to carry out the write-in of the video signal in accordance with the signal format used.

A 1-bit picture transmission identification code represented by "A/$\overline{P}$", is located at the eleventh bit of the second word of the header signal. When this picture transmission identification code is "1", it is identified that the digital video signal which is to be transmitted relates to a still picture which should be displayed in full on the screen (so-called full-picture transmission). On the other hand, if the picture transmission identification code is "0", it is identified that the digital video signal which is to be transmitted relates to a picture which should be displayed on a part of the screen by the so-called partial rewriting of the digital video signal.

A 1-bit write-in specifying code represented by "B19W", is located at the twelfth bit of the second word of the header signal. A 1-bit read-out specifying code represented by "B19R", is located at the thirteenth bit in the second word of the header signal. These write-in and read-out specifying codes are provided with respect to two memories within the reproducing apparatus which will be described hereinafter. When the write-in and read-out specifying codes are both "0" (or "1"), the picture element data of the digital video signal are written into a first (or second) memory, and the stored picture element data are read out and displayed on the screen. This means that the content of the picture is changed while displaying the picture, and as a result, it is possible to display a moving picture at a part of the still picture which is being displayed. On the other hand, when the write-in specifying code is "0" and the read-out specifying code is "1", the picture element data read out from a second memory are displayed while the picture element data are written into the first memory. In this case, the display on the screen is changed to the display of the picture element data read out from the first memory from the display of the picture element data read out from the second memory, according to an end-of-data signal, after the write-in with respect to the first memory is completed. The end-of-data signal is a one-word signal which is added to the terminal part of the digital video signal. Further, when the write-in specifying code is "1" and the read-out specifying code is "0", the picture element data read out from the first memory are displayed while the picture element data are written into the second memory.

Three 1-bit memory identification codes represented by "B2" through "B0", are located in the fourteenth through sixteen bits of the second word. Six columns of memory element groups are in field memories 58 and 59 within the reproducing apparatus which will be described hereinafter in conjunction with FIG. 6. The three memory identification codes identify which column of memory element groups is to store the picture element data groups transmitted immediately subsequent to the header signal. For example, if the three memory identification codes are "000", the picture element data groups are stored in the first column of memory element groups. Similarly, the picture element data groups are stored in the second, third, fourth, fifth, and sixth rows of memory element groups when the three memory identification codes are "100", "010", "110", "001", and "101".

The picture element data groups of the digital luminance signal are stored in the first through fourth columns of memory element groups. The picture element data groups of the first digital color difference signal are stored in the fifth column of memory element groups, and the picture element data of the second digital color difference signal are stored in the sixth column of memory element groups.

A third word of the header signal consists of upper eight bits 30a and lower eight bits 30b. The upper eight bits 30a comprises bits B3 through B10, and the lower eight bits 30b comprises bits B3 through B10. A fourth word of the header signal consists of upper eight bits 31a and lower eight bits 31b. The upper eight bits 31a comprises bits B11 through B18, and the lower eight bits 31b comprises bits B11 through B18. These third and fourth words of the header signal are 16-bit address codes, and indicate an address in the memory circuit for storing the first picture element data corresponding to the upper eight bits of the first word in the video signal part which is transmitted subsequent to the header signal. The bits B3 through B10 indicate the lower byte of the address code, and the bits B11 through B18 indicate the upper byte of the address code.

The television signals used throughout the world either have 625 scanning lines or 525 scanning lines. And, although the digital video signal is a time-sequentially multiplexed signal of picture element data of 572 scanning lines which actually include the picture information, the digital video signal is transmitted under the 625-line system. Accordingly, if reproduction is to be carried out under the 525-line system, the number of scanning lines must be converted in the reproducing apparatus before storing the picture element data into the memory circuit. Thus, the address signal for this memory circuit must assume two different addresses with respect to the 625-line system and the 525-line system. Hence, the bits "B3" through "B18" in the upper eight bits 30a and 31a, indicate the address of picture element data in the upper eight bits of the first word of the video signal part in the 625-line system. On the other hand, the bits "B3" through "B18" in the lower eight bits 30b and 31b, indicate the address of the picture element data in the upper eight bits of the first word of the video signal part in the 525-line system obtained by the conversion of the number of scanning lines.

A fifth word 32 and a sixth word 33 of the header signal, are spare words. Normally, these words 32 and 33 are all "0". Because it is known beforehand that these two words are all "0", these two words are not detected in the reproducing apparatus. The reproducing apparatus then goes on to detect the next picture element data group.

Returning now to FIG. 2, the signal processing circuit 17 is supplied with the digital video signal which is reproduced in the digital signal recorder 16 and having the signal format shown in FIG. 3, the 2-channel digital audio signals from the A/D converter 14, and the control signal generated from the control signal generating circuit 15. The signal processing circuit 17 rearranges these parallel data which are received into series data, and further sections the digital signals of each of the channels into predetermined sections and subjects these digital signals to time-division multiplexing by interleaving. The recording signal is formed by further adding an error code correction signal, error code detection signal, and synchronizing bits for indicating the beginning of the block (frame) to the time-division multiplexed signal.

FIG. 5 diagrammatically shows an example of one block (one frame) of the recording signal thus formed by the signal processing circuit 17. One block is made up of 130 bits, and the repetition frequency is 44.1 kHz (or 47.25 kHz) which is equal to the sampling frequency. In FIG. 5, 10-bit synchronizing signal bits having a fixed pattern for indicating the beginning of the block is represented by SYNC, 16-bit digital audio signals of a total of two channels are respectively represented by Ch-1 and Ch-2, and 16-bit digital video signals of two channels which are reproduced from the digital recorder 16 are represented by Ch-3 and Ch-4. In addition, P and Q indicated in FIG. 5 respectively are 16-bit error code correction signals, and are signals which are formed satisfying the following equations, for example.

$$P = W_1 \oplus W_2 \oplus W_3 \oplus W_4 \qquad (1)$$

$$Q = T^4 \cdot W_1 \oplus T^3 \cdot W_2 \oplus T^2 \cdot W_3 \oplus T \cdot W_4 \qquad (2)$$

In the above equations (1) and (2), $W_1$, $W_2$, $W_3$, and $W_4$ respectively indicate each of the 16-bit digital signals Ch-1 through Ch-4 (normally, these signals are digital signals in different blocks), T indicates a companion matrix of a predetermined polynomial, and $\oplus$ indicates a modulo-2 addition in terms of each of the corresponding bits.

In FIG. 5, a 23-bit error code detection signal is represented by CRC. The error code detection signal CRC is a 23-bit remainder which is obtained when each of the words in Ch-1 through Ch-4, P, and Q are divided by a producing polynomial $X^{23} + X^5 + X^4 + X + 1$, for example. Upon reproduction, the signals from the ninth bit to the 127-th bit of the same block are divided by the above producing polynomial, and this error code detection code is used to detect that there is no error when the remainder is zero. The control signal which is used for random access and the like and described previously, is represented by Adr. One bit of this control signal Adr is transmitted within one block, and for example, all the bits of the control signal are transmitted by 196 blocks. Accordingly, the control signal is made up of 196 bits. Two bits represented by U are the so-called user's bits. The user's bits are spare bits. Therefore, the signal of one block is made up of a total of 130 bits including the synchronizing signal bits represented by SYNC through the user's bits represented by U, and the digital signal is time-sequentially transmitted in terms of such blocks at a frequency which is the same as the sampling frequency of 44.1 kHz of the digital audio signal, for example. The transmitted digital signal is passed through a modulator 18 and a recording apparatus 19 which uses a laser beam, and finally recorded on the disc 20. Thus, if the rotational speed of the disc 20 is 900 rpm, 2940 blocks are recorded or reproduced in one revolution of the disc 20. This means that the 196-bit control signal is recorded or reproduced fifteen times in one revolution of the disc 20.

In the modulator 18, the digital signal from the signal processing circuit 17 is subjected to modified frequency modulation (MFM) or randomized by use of a maximum length sequence and carrying out a modulo-2 addition, for example, and thereafter formed into a frequency modulated signal by frequency-modulating a carrier of 7 MHz, for example. In addition, the recording apparatus 19 forms a first modulated light beam which is obtained by modulating the frequency modulated signal from the modulator 18, and a second modulated light beam which is modulated by a first tracking control signal fp1 or a second tracking control signal fp2. The first and second modulated light beams are focused on a photosensitive layer which is formed on a disc. A stamper disc is formed by carrying out known developing and disc manufacturing processes. The disc 20 is duplicated from this stamper disc.

The disc 20 is recorded with the frequency-modulated signal of the signal which is obtained by time-sequentially multiplexing the digital audio signals and the digital video signals in terms of blocks where one block has the signal format shown in FIG. 5. This frequency-modulated signal is recorded on a spiral main track on the disc 20 as rows of intermittent pits. The first and second tracking control signals fp1 and fp2 of a constant frequency within a band lower than the band of the above frequency-modulated signal, are alternately recorded as rows of intermittent pits on subtracks at substantially intermediate parts between centerlines of mutually adjacent main tracks for each track turn of the disc 20. Further, a third tracking control signal fp3 is recorded on the main track at parts where the sides on which the first and second tracking control signals fp1 and fp2 are recorded change over. Tracking grooves for guiding a reproducing stylus are not formed on the disc 20, and the disc 20 has an electrode function.

The component coded signals within the digital video signal which is recorded on the disc 20, are made up of picture element data which amounts to a total of one field and are arranged in a checkered pattern in the picture as indicated by the hatchings in FIG. 1. In addition, the component coded signals related to a plurality of color still pictures, are recorded on the disc 20 in correspondence with the music programs. However, these component coded signals related to the plurality of color still pictures, are component coded signals which are made up of picture element data arranged in the checkered pattern and amount to one field, or are component coded signals amounting to one frame.

Figure 6:
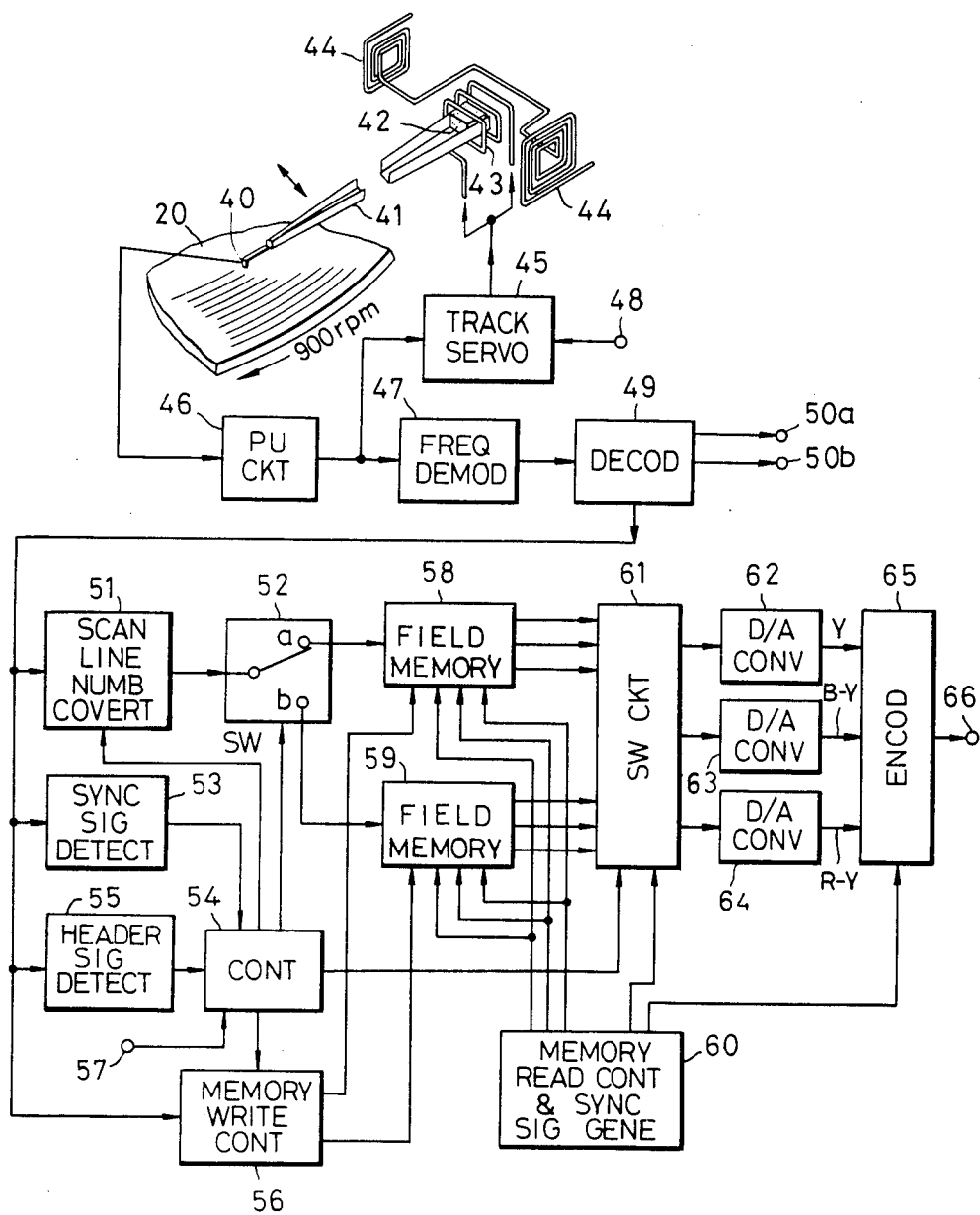
FIG. 6 is a systematic block diagram showing an embodiment of a reproducing apparatus according to the present invention.

Next, description will be given with respect to a reproducing apparatus according to the present invention which reproduces the recorded signals from the disc 20 described heretofore, by referring to FIG. 6. The characterizing feature of the present embodiment, is the method of carrying of the write-in and read-out with respect to the field memories 37 and 38.

The disc 20 is placed onto a turntable (not shown) and rotated at a rotational speed of 900 rpm. A bottom of a reproducing stylus 40 slides over the surface of the rotating disc 20. The reproducing stylus 40 is fixed to one end of a cantilever 41, and a permanent magnet 42 is fixed to the other base end of the cantilever 41. The part of the cantilever 41 where the permanent magnet 42 is fixed, is encircled by a tracking coil 43 and a jitter compensation coil 44 fixed to the reproducing apparatus. The tracking coil 43 generates a magnetic field along a direction perpendicular with respect to the magnetic direction of the permanent magnet 42. Accordingly, the cantilever 41 is moved along one of the directions in the width direction of the track according to the polarity of a tracking error signal from a tracking servo circuit 45 with a displacing quantity according to the magnitude of the tracking error signal.

A high-frequency reproduced signal is obtained from a pickup circuit 46. This pickup circuit 46 comprises a resonance circuit which is varied of its resonance frequency in response to the variations in electrostatic capacitance formed between an electrode fixed to a rear surface of the reproducing stylus 40 by deposition and the disc 20 according to the rows of intermittent pits, a circuit for applying a signal of a constant frequency to this resonance circuit, a circuit for amplitude-detecting a high-frequency signal from the resonance circuit varying in its amplitude according to the above variations in the electrostatic capacitance, and a circuit for preamplifying the amplitude-detected high-frequency signal (reproduced signal). The high-frequency signal obtained from the pickup circuit 46 is supplied to a frequency demodulating circuit 47 wherein the main information signal (the digital audio signals and the time-sequentially multiplexed digital video signal in this case) from the main track is demodulated on one hand, and a part thereof is separated and supplied to the tracking servo circuit 45.

The tracking servo circuit 45 frequency-selects and obtains the first through third tracking control signals fp1 through fp3 from the reproduced signal. Envelopes of the first and second tracking control signals fp1 and fp2 thus obtained are detected and passed through a differential amplifier (not shown) to obtain the tracking error signal, and this tracking error signal is supplied to the tracking coil 43. Here, it must be noted that the positional relationships between the first and second tracking control signals fp1 and fp2 with respect to the main track, changes for each track turn of the disc 20. Accordingly, the tracking polarity is reversed for each track turn of the disc 20, by a switching pulse produced according to the detection or reproduction of the third tracking control signal fp3. The tracking servo circuit 45 drives the tracking coil 43 so that the reproducing stylus 40 is forcibly kicked and shifted by one or more than track pitch along the track width direction according to a kick instruction signal, when the kick instruction signal is applied to an input terminal 48.

On the other hand, the demodulated digital signal obtained from the frequency demodulator 47 is applied to a decoder 49 wherein the demodulated digital signal is subjected to MFM demodulation and formed into the time-sequentially multiplexed signal having the signal format shown in FIG. 5. The beginning of the block of the time-sequentially multiplexed signal is detected according to the synchronizing signal bits SYNC, and the series signal is converted into a parallel signal, and furthermore, the error is detected. The error code correction signals P and Q are used to correct the error and restore the signal only when an error is detected. Hence, by correcting the error and restoring the signal according to the needs, two channels of the 16-bit digital audio signals including no errors among the four channels of 16-bit digital signals restored to their original order with interleaving signal arrangement, are converted into analog audio signals by a digital-to-analog (D/A) converter within the decoder 49 and produced through output terminals 50a and 50b. In addition, the pickup control signal is supplied to a predetermined circuit (not shown) for carrying out high-speed search and the like.

The digital video signal having the signal format shown in FIG. 3 which is time-sequentially reproduced from the third and fourth channels, is supplied to a converting circuit 51 for converting the number of scanning lines. The number of scanning lines is converted into 525 lines from 625 lines at the converting circuit 51.

The scanning line number converting circuit 51 is only needed in the reproducing apparatus where it is necessary to reproduce and produce an analog color video signal in accordance with the NTSC system which is a 525-line system, and there is no need for the scanning line number converting circuit 51 in reproducing apparatuses where it is only necessary to reproduce and produce an analog color video signal in accordance with the PAL system or the SECAM system which are 625-line systems. However, a switch for switching the input and output of the scanning line number converting circuit 51 may be provided in some reproducing apparatuses. In such reproducing apparatuses, the switch can be switched to make the scanning line number converting circuit 51 operative or inoperative according to the number of scanning lines of the television system. The output picture element data of the scanning line number converting circuit 51 is supplied to the field memory 58 or 59 through a switching circuit 52.

The digital video signal successively obtained time-sequentially from the decoder 49 with the signal format shown in FIG. 3, is supplied to a synchronizing signal detecting circuit 53, a header signal detecting circuit 55, and a memory write controller 56. The synchronizing signal detecting circuit 53 detects the synchronizing signal within the header signal, and supplies a detection signal to a control circuit 54. The header signal detecting circuit 55 discriminates each of the codes and address signal within the header signal, and supplies a resulting output to the control circuit 54.

The control circuit 54 is supplied with signals such as a synchronizing signal detection signal from the synchronizing signal detecting circuit 53, detection signals of each of the codes within the header signal obtained from the header signal detecting circuit 55, and a signal (category number signal) specifying the desired category (various kinds of special picture identified by the picture category identification code "P.G") selected by the user of the reproducing apparatus and applied to an input terminal 57 by manipulating an external switch and the like. The control circuit 54 discriminates each of the signals supplied thereto, and controls the scanning line number converting circuit 51, the switching circuit 52, the memory write controller 56, a switching circuit 61, and the like.

The memory write controller 56 carried out control so that the picture element data within the digital video signal which is supplied to the field memory 58 or 59, is written into a predetermined address according to the address signal within the header signal. However, the memory write controller 56 carried out control so that the header signal is not written in the field memory. The switching circuit 52 is switched over to connect to a contact a or b by the control signal from the control circuit 54, in accordance with the write-in specifying code within the header signal. Thus, the digital video signal is supplied to the field memory 58 or 59 which is specified by the write-in specifying code.

The field memories 58 and 59 simultaneously read out the reproduced picture element data which are written in according to a read-out control signal from a memory read controller and synchronizing signal generator 60, and also compensate for the jitter introduced upon reproduction. The digital luminance signals read out from the field memories 58 and 59 are read out with a sampling frequency of 9 MHz and a quantization number of eight bits with respect to one picture, and the first and second digital color difference signals read out from the field memories 58 and 59 are read out with a sampling frequency of 2.25 MHz and a quantization number of eight bits with respect to one picture. The digital luminance signal and the first and second digital color difference signals thus read out from the memories 58 and 59, are supplied to the switching circuit 61.

Next, more detailed description will be given with respect to the construction of the field memories 58 and 59, and with respect to the write-in and read-out operations. If it is assumed that the field memories 58 and 59 store all the quantization number of bits, sixteen ($=8\times 2$) 64k RAMs will be needed with respect to the picture element data of the digital luminance signal of one field, as may be easily understood from the description given before. In addition, four ($=8\times\frac{1}{2}$) 64k RAMs will be needed with respect to the picture element data of the two kinds of digital color difference signals amounting to one field. Therefore, the total number of 64k RAMs which will be needed to construct the field memories 58 and 59 is forty-eight ($=(16+4+4)\times 2$).

Figures 7, 8:
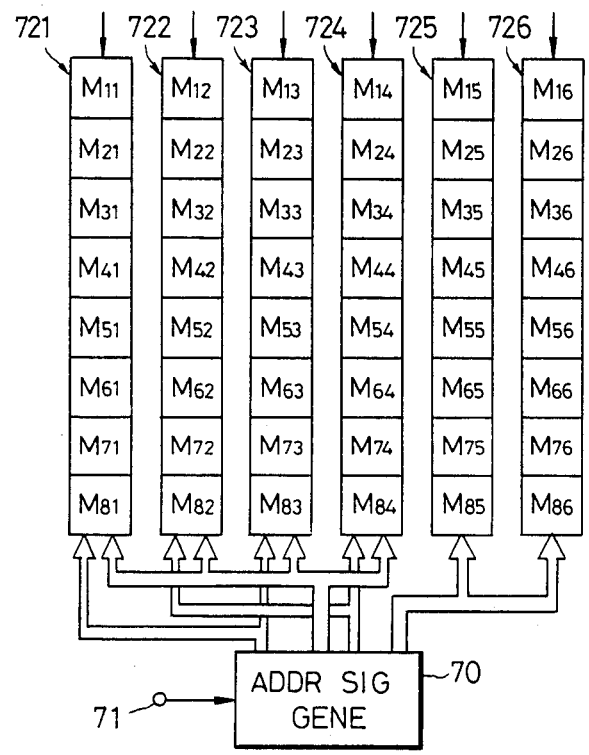
FIG. 7 is a systematic block diagram showing an embodiment of a field memory within the reproducing apparatus shown in FIG. 6.
FIG. 8 diagrammatically shows original display positions picture element data in the picture, which picture element data are to be written into the field memory within the reproducing apparatus according to the present invention.

That is, the field memories 58 and 59 comprise forty-eight 64k RAMs $M_{11}$ through $M_{86}$ which are arranged in six columns each having eight stages as shown in FIG. 7. Each column of the 64k RAMs consists of four 64k RAMs which store picture element data of the digital luminance signal, one 64k RAM which stores the picture element data of the first digital color difference signal, and one 64k RAM which stores the picture element data of the second digital color difference signal. The field memories 58 and 59 are designed so that four columns of picture element data groups of the digital luminance signal and one column each of picture element data groups of the two kinds of digital color difference signals, that is, a total of six columns of picture element data which are transmitted in terms of the same unit as described before in conjunction with FIG. 3, are stored at the same address according to a common address signal received from an address signal generating circuit 70. Among the six memory element columns $72_1$ through $72_6$ of the 64k RAMs, the picture element data of the digital luminance signal corresponding to two fields are stored in the first four memory element columns $72_1$ through $72_4$ which are made up of thirty-two 64k RAMs $M_{11}$ through $M_{84}$. The picture element data of the digital color difference signal (R−Y) amounting to two fields, are stored in the fifth memory element column $72_5$ which is made up of eight 64k RAMs $M_{15}$, $M_{25}$, ..., and $M_{85}$. The picture element data of the digital color difference signal (B−Y) amounting to two fields, are stored in the sixth memory element column $72_6$ which is made up of eight 64k RAMs $M_{16}$, $M_{26}$, ..., and $M_{86}$. The address signal generating circuit 70 is supplied with a signal from the memory write controller 56, through a terminal 71.

Next, description will be given with respect to the operations of the field memories 58 and 59. The address signal generating circuit 70 is designed so as to generate a 16-bit address signal indicating an address which is in accordance with the memory identification codes "B0" through "B2" and the address codes "B3" through "B18" within the header signal shown in FIG. 4. The reproduced component component signals are supplied to one of the memory element columns $72_1$ through $72_6$, through a switch which is not shown in FIG. 7. First, when the header signal $H_1$ shown in FIG. 3 is reproduced, the address signal generating circuit 70 generates an address signal having a hexadecimal value "0000". In addition, the picture element data in the upper eight bits of the first word in the picture element data group $Y_1$ of the digital luminance signal, is applied in parallel to only the 64k RAMs $M_{11}$, $M_{21}$, $M_{31}$, ..., $M_{71}$, and $M_{81}$ in the memory element column $72_1$. The picture element data in the upper eight bits of this first word, is the picture element data represented by $E_{11}$ in the picture shown in FIG. 8. For example, the data in the MSB of the upper eight bits is written into the RAM $M_{11}$ at an address "0000", the data in the second bit is written into the RAM $M_{21}$ at the address "0000", and the data in each of the remaining bits are similarly written into the RAMs $M_{31}$, $M_{41}$, $M_{51}$, $M_{61}$, $M_{71}$, and $M_{81}$ at the address "0000".

The address signal generating circuit 70 then generates an address signal having a hexadecimal value "0072", and the picture element data in the lower eight bits of the first word in the picture element data group $Y_1$ are respectively applied in parallel to the RAMs $M_{11}$, $M_{21}$, $M_{31}$, ..., $M_{71}$, and $M_{81}$. This picture element data is the picture element data represented by $E_{31}$ in FIG. 8, and each bit is written into the RAMs $M_{11}$ through $M_{81}$ in the first memory element column $72_1$ at the address having the hexadecimal value "0072". Thereafter, the address signal generating circuit 70 generates an address signal having a hexadecimal value "00E4", and each bit of the picture element data $E_{51}$ in the upper eight bits of the second word in the picture element data group $Y_1$ is written into the RAMs $M_{11}$ through $M_{81}$ in the first memory element column $72_1$ at the address having the hexadecimal value "00E4". The write-in operation is similarly carried out for subsequent words in the picture element data group $Y_1$. Each bit of the picture element data $E_{m-1,1}$ ($E_{571,1}$ in this case) shown in FIG. 8 in the lower eight bits of the 143-rd word in the picture element data group $Y_1$, is written into the RAMs $M_{11}$ through $M_{81}$ in the first memory element column $72_1$ at an address having a hexadecimal value "7EEA". Therefore, each picture element data in the picture element data group $Y_1$ is written into the RAMs $M_{11}$ through $M_{81}$ in the first memory element column $72_1$, and the address where each picture element data is written is increased from "0000" to "7EEA" in steps of 114.

The picture element data group $Y_2$ of the digital luminance signal which is reproduced, is applied in parallel to the RAMs $M_{12}$, $M_{22}$, $M_{32}$, ..., and $M_{82}$ in the second memory element column $72_2$. First, the picture element data (picture element data of the second field indicated by $E_{22}$ with the hatchings in FIG. 8) in the upper eight bits of the first word is written in at the address "0000" of the RAMs $M_{12}$ through $M_{82}$ in the second memory element column $72_2$. The picture element data in the lower eight bits of the first word, the picture element data in the upper eight bits of the second word, etc., are each written into the RAMs $M_{12}$ through $M_{82}$ in the second memory element column $72_2$ at an address which is increased in steps of 114. Further, each picture element data in the picture element data group $Y_3$ of the digital luminance signal, is written into the RAMs $M_{13}$ through $M_{83}$ in the third memory element column $72_3$ at an address which is increased from "0000" to "7EEA" in steps of 114. Similarly, each picture element data in the picture element data group $Y_4$, is written into the RAMs $M_{14}$ through $M_{84}$ in the fourth memory element column $72_4$ at an address which is increased from "0000" to "7EEA" in steps of 114.

The first column of picture element group of the first digital color difference signal represented by $(R-Y)_1$ in FIG. 3, is written into the RAMs $M_{15}$, $M_{25}$, ..., and $M_{85}$ in the fifth memory element column $72_5$. The first column of picture element group of the second digital color difference signal represented by $(B-Y)_1$, is written into the RAMs $M_{16}$, $M_{26}$, ..., and $M_{86}$ in the sixth memory element column $72_6$. The address where these picture element groups of the first and second digital color difference signals, are respectively written into the RAMs $M_{15}$ through $M_{85}$ and the RAMs $M_{16}$ through $M_{86}$ at an address which is increased from "0000" through "7EEA" in steps of 114.

When the header signal $H_7$ is reproduced, the address signal generating circuit 70 generates an address signal having a hexadecimal value "0001". Moreover, the picture element data (represented by $E_{15}$ in FIG. 8) in the upper eight bits of the first word in the picture element data group $Y_5$ of the digital luminance signal shown in FIG. 3, is applied in parallel and written into the RAMs $M_{11}$, $M_{21}$, $M_{31}$, ..., $M_{71}$, and $M_{81}$ in the first memory element column $72_1$. Next, the address signal generating circuit 70 generates an address signal having a hexadecimal value "0073", and the picture element data (represented by $E_{35}$ in FIG. 8) in the lower eight bits of the first word in the picture element data group $Y_5$ is written into the RAMs $M_{11}$ through $M_{81}$ in the first memory element column $72_1$ at the address "0073". Thereafter, each picture element data in the picture element data group $Y_5$ is similarly written into the RAMs $M_{11}$ through $M_{81}$ in the first memory element column $72_1$, at an address which is increased in steps of "0072" in hexadecimal.

Similarly, the sixth column of picture element data group $Y_6$ of the digital luminance signal, is written into the RAMs $M_{12}$ through $M_{82}$ in the second memory element column $72_2$ at an address which is increased from "0001" to "7EEB" in steps of 114. The seventh and eighth columns of picture element data groups $Y_7$ and $Y_8$ of the digital luminance signals, are respectively written into the RAMs $M_{13}$ through $M_{83}$ in the third memory element column $72_3$ and the RAMs $M_{14}$ through $M_{84}$ in the I fourth memory element column $72_4$, at an address which is also increased from "0001" to "7EEB" in steps of 114. The second columns of picture element data groups $(R-Y)_2$ and $(B-Y)_2$ of the two kinds of digital color difference signals in the second field, are respectively written into the RAMs $M_{15}$ through $M_{85}$ in the fifth memory element column $72_5$ and the RAMs $M_{16}$ through $M_{86}$ in the sixth memory element column $72_6$, at an address which is also increased from "0001" to "7EEB" in steps of 114. Thus, by thereafter carrying out the write-in operations in this sequence, the picture element data corresponding to one field, become written into the RAMs $M_{11}$ through $M_{86}$ occupying half the total memory capacity (that is, corresponding to the first field memory 58). Picture element data corresponding to one field, are also written into the RAMs $M_{11}$ through $M_{86}$ to occupy the remaining half of the total memory capacity (that is, corresponding to the second field memory 59), however, the addresses where these picture element data are written are different from the addresses where the first mentioned picture element data are written in the first field memory 58.

FIG. 9 diagrammatically shows the write-in states of the picture element data in the field memory 58 or 59. In FIG. 9, a picture element data $E_{ij}$ represents a picture element data which is located at the i-th position with respect to the horizontal direction and at the j-th position with respect to the vertical direction in the picture, among the picture element data which make up one frame. The picture element data which are encircled, represent the picture element data of the second field. The picture element data which are not encircled represent the picture element data of the first field. The same representation will be employed in FIGS. 10A and 10B which will be described hereinafter. Further, in FIG. 9, the picture element data $E_{11}$, $E_{22}$, $E_{13}$ and $E_{24}$ are written into the first through fourth memory element columns $72_1$ through $72_4$, at the address "0000". The picture element data $E_{15}$, $E_{26}$, $E_{17}$, and $E_{28}$ are written into the first through fourth memory element columns $72_1$ through $72_4$, at the address "0001". Similarly, the picture element data $E_{31}$, $E_{42}$, $E_{33}$, and $E_{44}$ are written into the first through fourth memory element columns $72_1$ through $72_4$, at the address "0072" in hexadecimal. In the present embodiment, n=456, and m=572.

Next, description will be given with respect to the read-out operations of the field memories 58 and 59. The address signal generating circuit 70 comprises a write-in address counter and a read-out address counter. The read-out address counter includes a first address counter in which the address value increases from "0000" to "7F5B" in steps of "1", and a second address counter which generates an address signal having a value which is greater than the output address value of the first address counter by "0072" in hexadecimal. First, during the reproducing period of the first field, the address signal from the first address counter is applied to all of the RAMs $M_{11}$ through $M_{86}$ shown in FIG. 7. As a result, the picture element data diagrammatically shown in, FIG. 10A are displayed on the screen during the reproducing time period of the first field. That is, the picture element data $E_{11}$ through $E_{2n}$ in the scanning line 1 are first read out, and thereafter, the picture element data in the scanning lines 3, 5, ..., and m-1 are sequentially read out for each line.

During the reproducing time period of the second field, the output address signal of the second address counter is applied to each of the RAMs $M_{11}$ through $M_{81}$ in the first memory element column $72_1$ and the RAMs $M_{13}$ through $M_{83}$ in the third memory element column $72_3$. Further, the output address signal of the first address counter is applied to each of the RAMs $M_{12}$ through $M_{82}$ in the second memory element column $72_2$ and the RAMs $M_{14}$ through $M_{84}$ in the fourth memory element column $72_4$. Moreover, the output address signals of the first and second address counters, are alternately applied to the RAMs $M_{15}$ through $M_{85}$ in the fifth memory element column $72_5$ and the RAMs $M_{16}$ through $M_{86}$ in the sixth memory element column $72_6$. Accordingly, during the reproducing period of the second field, the picture element data $E_{31}$ is read out from the address "0072" in the RAMs $M_{11}$ through $M_{81}$, the picture element data $E_{22}$ is read out form the address "0000" in the RAMs $M_{12}$ through $M_{82}$, the picture element data $E_{33}$ is read out from the address "0072" in the RAMs $M_{13}$ through $M_{83}$, and the picture element data $E_{24}$ is read out from the address "0000" in the RAMs $M_{14}$ through $M_{84}$. In addition, the picture element data at the address "0072", for example, is read out from the RAMs $M_{15}$ through $M_{85}$ and $M_{16}$ through $M_{86}$.

The picture element data $E_{35}$ is read out from the address "0073" in the RAMs $M_{11}$ through $M_{81}$, the picture element data $E_{26}$ is read out from the address "0001" in the RAMs $M_{12}$ through $M_{82}$, the picture element data $E_{37}$ is read out from the address "0073" in the RAMS $M_{13}$ through $M_{83}$, and the picture element data $E_{28}$ is read out from the address "0001" in the RAMs $M_{14}$ through $M_{84}$. Further, the picture element data at the address "0001" is read out from the RAMs $M_{15}$ through $M_{85}$ and $M_{16}$ through $M_{86}$.

Thus, during the reproducing time period of the second field, the picture element data in the scanning lines adjacent to the scanning lines during the reproducing time period of the first field, are displayed on the screen in sequence. Accordingly, the picture element data shown in FIG. 10B are displayed on the screen during the reproducing time period of the second field. That is, the picture element data in the scanning line 2, are displayed in the sequence of the picture element data $E_{31}$ in the scanning line 3, the picture element data $E_{22}$ in the scanning line 1, the picture element data $E_{33}$ in the scanning line 3, etc. (excluding the case of the scanning line m). Accordingly, the picture element data of the first field and the picture element data of the second field are alternately arranged in one scanning line, both during the reproducing time period of the first field and the reproducing time period of the second field. Further, the arrangement of the picture element data is different between the reproducing time period of the first field and the reproducing time period of the second field. As a result, deterioration in the apparent vertical resolution is reduced compared to the conventional method. In addition, because the correlation is high between picture element data in the adjacent scanning lines, the aliasing noise is dispersed in the high frequencies. Therefore, it is possible to reduce the visual noise due to the aliasing noise.

Next, further description will be given by referring again to FIG. 6. The picture element data read out from the field memory 58 or 59, are supplied to the switching circuit 61 which selectively produces the data according to the read-out specifying code within the header signal. The picture element data of the digital luminance signal is thus supplied to a digital-to-analog (D/A) converter 62, and the picture element data of the two kinds of digital color difference signals are respectively supplied to D/A converters 63 and 64.

The analog luminance signal obtained from the D/A converter 62, the color difference signals (R−Y) and (B−Y) obtained from the D/A converters 63 and 64, the horizontal and vertical synchronizing signals and the color burst signal respectively obtained from the memory read controller and the synchronizing signal generating circuit 60, are respectively supplied to an encoder 65 which produces a color video signal which is in conformance with the NTSC system. The color video signal which is in conformance with the NTSC system, is supplied to a monitoring color television receiver (not shown) through an output terminal 66. The color still picture, partially moving picture, and the like which is displayed on the television receiver, acts as a supplementary information for the listener to enjoy, with respect to the reproduced sound which is obtained by reproducing the audio signals produced through the output terminals 50a and 50b.

In the embodiment described before, it was assumed that the picture element data which are arranged in the checkered pattern as shown by the data with the hatchings in FIG. 1, are recorded on the disc 20. However, the reproducing apparatus according to the present invention is not limited to playing the disc 20 which is recorded with the field picture. The reproducing apparatus according to the present invention may also play a disc which is recorded with a frame picture. Further, the signal format of the digital video signal is not limited to the signal format shown in FIG. 3. For example, picture element data corresponding to scanning lines in the range of two may be arranged in the video signal part subsequent to the header signal.

Description given heretofore was based on the case where the present invention is applied to the disc recording system and reproducing apparatus which were previously proposed in the name of the same assignee. However, the application of the present invention is not limited to the above. For example, the present invention may be applied to a disc of the electrostatic capacitance type, or an optical type disc from which the recorded information is reproduced optically by use of a light beam. Further, if the case where the television receiver has three input terminals for the three primary colors of red (R), green (G), and blue (B), a matrix circuit may be used instead of the encoder 65. In this case, the matrix circuit converts the luminance signal Y and the color difference signals (R−Y) and (B−Y) into the three primary color signals R, G, and B, and independently supplies these primary color signals R, G, and B to the input terminals of the television receiver. The reproduced picture displayed on the television receiver will be of an exceedingly high quality. In addition, the combination of the color difference signals which are recorded on the disc 20, may be a combination including the color difference signals (G−Y) and (R−Y) or (B−Y). It is of course obvious that the I and Q signals, or the three primary color signals may be recorded on the disc 20.

Further, the present invention is not limited to these embodiments, but various variations and modifications may be made without departing from the scope of the present invention.

What is claimed is:

1. An information signal recording medium having a spiral track on which an information signal is pre-recorded, said information signal including picture element data and being time-sequentially recorded on said spiral track in terms of said picture element data which amount to one field, the pre-recorded information signal being picked up and reproduced by a reproducing element which scans over said spiral track, said picture element data which amount to one field being made up of a plurality of picture element data of a first field and a plurality of picture element data of a second field out of picture element data which are obtained by subjecting an analog video signal of one frame to a digital pulse modulation, said analog video signal of one frame being made up of said first and second fields which constitute one picture, said information signal comprising divided picture element data groups and header signals of which one is added to a beginning of each of the picture element data groups, said divided picture element data groups being obtained by dividing said picture element data which amount to one field in terms of a predetermined number of rows or columns of picture element data groups which are adjacent to each other in said one picture, each of said header signals at least including synchronizing signals and codes for specifying addresses in memory circuits within a reproducing apparatus where specific picture element data out of said divided picture element groups are to be stored.

2. An information signal recording medium as claimed in claim 1 in which said picture element data which amount to one field are picture elements selected correspondingly to a checkered pattern of said one picture.

3. An information signal recording medium as claimed in claim 1 in which said analog video signal is a color video signal, and said picture element data which amount to one field are signals in which picture element data of a digital luminance signal amounting to one field and picture element data of two digital color difference signals respectively amounting to one field are time-sequentially multiplexed, said digital luminance signal and said two digital color difference signals being obtained by independently subjecting a luminanee signal and two color difference signals in said color video signal to a digital 4. A reproducing apparatus for reproducing recorded signal from an information signal recording medium having a spiral track on which an information signal is pre-recorded, said information signal including picture element data and being time-sequentially recorded on the spiral track in terms of said picture element data which amount to one field, said picture element data which amount to one field being made up of a plurality of picture element data of a first field and a plurality of picture element data of a second field out of picture element data which are obtained by subjecting an analog color video signal of one frame to a digital pulse modulation, said picture element data which amount to one field being signals in which picture element data of a digital luminance signal amounting to one field and picture element data of two digital color difference signals respectively amounting to one field are time-sequentially multiplexed, said digital luminance signal and said two digital color difference signals being obtained by independently subjecting a luminance signal and two color difference signals in the analog color video signal to a digital pulse modulation, said analog color video signal of one frame being made up of said first and second fields which constitute one picture, said reproducing apparatus comprising:

reproducing means for scanning over the spiral track on said information signal recording medium to reproduce the recorded signals;

a plurality of memory circuits each having at least a memory capacity for storing data amounting to one one field and each including a first memory part for storing the picture element data of said digital luminance signal and second and third memory parts for independently storing the picture element data of said two digital color difference signals, said first memory part being made up of a plurality of columns of random access memories, each of said columns of random access memories consisting of k stages, where k is a quantization number of bits of picture element data which are to be reproduced, said second and third memory parts each being made up of one column of random access memories with k stages in one column;

write-in cotrol means for carrying out control so that said picture element data which amount to one field and are within a reproduced information signal received from said reproducing means are successively written into one memory circuit out of said plurality of memory circuits;

read-out control means for carrying out control so that picture element data are read out from said one memory circuit in a sequence $PE_{(i-1)\ (j-1)}$, $PE_{ij}$, $PE_{(i-1)\ (j+1)}$, ... during a reproducing time period of a predetermined field and picture element data are read out from said one memory circuit in a sequence $PE_{(i+1)\ (j-1)}$, $PE_{ij}$, $PE_{(i+1)\ (j+1)}$, ... during a reproducing time period of a subsequent field, and such read-out sequences are alternately carried out in terms of fields and repeated, where $PE_{ij}$ represents the location of a picture element data out of the picture element data which are written in said one memory circuit, and $PE_{ij}$ is the picture element data at an i-th position in a vertical direction and a j-th position in a horizontal direction of the picture, where i and j are natural numbers greater than or equal to two; and means for converting picture element data which are read out from said one memory circuit into an analog color video signal which is in conformance with a standard television system.

5. A reproducing apparatus as claimed in claim 4 in which said write-in control means alternately writes the picture element data of the first field and the picture element data of the second field out of the reproduced picture element data which amount to one field into said one memory circuit at successive addresses.

* * * * *